(12) United States Patent
Kim et al.

(10) Patent No.: US 9,162,202 B2
(45) Date of Patent: Oct. 20, 2015

(54) HIGH PERFORMANCE CHIMNEY TRAY FOR A FIXED BED REACTOR

(75) Inventors: Myung Jun Kim, Daejeon (KR); Seong Jun Hong, Ulsan (KR); Yong Woon Kim, Daejeon (KR); Gyung Rok Kim, Daejeon (KR); Kug Kyong Song, Ulsan (KR); Jae Wook Ryu, Daejeon (KR); Hong Chul Kim, Seoul (KR); Keun Seok Yang, Seoul (KR)

(73) Assignee: SK Innovation Co., Ltd. (KR)

( * ) Notice: Subject to any disclaimer, the term of this patent is extended or adjusted under 35 U.S.C. 154(b) by 709 days.

(21) Appl. No.: 13/375,295

(22) PCT Filed: Feb. 10, 2010

(86) PCT No.: PCT/KR2010/000816
§ 371 (c)(1),
(2), (4) Date: Jan. 5, 2012

(87) PCT Pub. No.: WO2010/140756
PCT Pub. Date: Dec. 9, 2010

(65) Prior Publication Data
US 2012/0100048 A1      Apr. 26, 2012

(30) Foreign Application Priority Data

Jun. 2, 2009 (KR) .................. 10-2009-0048565

(51) Int. Cl.
*B01J 19/32* (2006.01)
*B01J 8/00* (2006.01)
(Continued)

(52) U.S. Cl.
CPC .............. *B01J 8/008* (2013.01); *B01J 8/0278* (2013.01); *B01J 2208/00849* (2013.01); *B01J 2208/00938* (2013.01)

(58) Field of Classification Search
CPC ............ B01J 19/00; B01J 19/32; B01J 10/00; B01J 8/00; B01J 8/008; B01J 8/02; B01J 8/0278; B01J 2208/00; B01J 2208/00849; B01J 2208/00938; B01J 35/00; B01J 35/02; B01D 3/00; B01D 3/14; B01D 3/16; B01D 3/18; B01D 3/20; B01D 53/00; B01D 53/14; B01D 53/18; B01F 3/00
USPC ..................... 422/129, 211, 220; 261/19, 75, 261/100–103, 108
See application file for complete search history.

(56) References Cited

U.S. PATENT DOCUMENTS 4,140,625 A     2/1979 Jensen
4,557,877 A  * 12/1985 Hofstetter ....................... 261/97
(Continued)

FOREIGN PATENT DOCUMENTS

JP          60-193225         12/1985
JP          S61-840           1/1986
(Continued)

OTHER PUBLICATIONS

Machine translation of KR 10-0421130, which was published on Aug. 17, 1998.*
(Continued)

*Primary Examiner* — Natasha Young
(74) *Attorney, Agent, or Firm* — DLA Piper LLP (US)

(57) ABSTRACT

A chimney tray for a reactor, wherein a gas reactant and a liquid reactant are mixed in chimneys to improve the dispersion performance of the liquid reactant on the catalyst bed of a fixed bed reactor thereby increasing the contact efficiency between the liquid reactant and the catalyst depending on the uniformity of flow of the liquid reactant, resulting in increased reaction efficiency, and which includes a tray having a plurality of through-holes, and a plurality of chimneys perpendicularly inserted into the through-holes of the tray and having one or more outlets penetrating there through and facing each other, wherein each of the plurality of chimneys includes a conical lower end which is formed such that it extends from the lower surface of the tray to make an angle of 10~40° with respect to the direction of the normal line of the tray.

4 Claims, 8 Drawing Sheets

(51) Int. Cl.
  *B01J 8/02*   (2006.01)
  *B01J 19/00*   (2006.01)
  *B01J 35/00*   (2006.01)
  *B01J 35/02*   (2006.01)
  *B01F 3/00*   (2006.01)
  *B01D 3/00*   (2006.01)
  *B01D 3/14*   (2006.01)
  *B01D 3/16*   (2006.01)
  *B01D 3/18*   (2006.01)
  *B01D 53/00*   (2006.01)
  *B01D 53/14*   (2006.01)

(56) References Cited

U.S. PATENT DOCUMENTS 6,093,373 A   7/2000   Darmancier et al.
2001/0055548 A1   12/2001   Harter et al.
2006/0078483 A1*   4/2006   Kemoun et al. ............... 422/188

FOREIGN PATENT DOCUMENTS

| JP | 7-031866 | 2/1995 |
| KR | 10-0421130 | 2/2004 |
| KR | 10-0421130 B1 | 6/2004 |
| WO | 2005-077518 A1 | 8/2005 |
| WO | 2006/044265 | 4/2006 |

OTHER PUBLICATIONS

European Supplemental Search Report dated Sep. 26, 2013.
A Japanese Office Action dated Apr. 2, 2014 for corresponding Japanese Application No. 2012-513847 along with an English Summary.

* cited by examiner

HIGH PERFORMANCE CHIMNEY TRAY FOR A FIXED BED REACTOR

RELATED APPLICATIONS

This is a §371 of International Application No. PCT/KR2010/000816, with an international filing date of Feb. 10, 2010 (WO 2010/140756, published Dec. 9, 2010), which is based on Korean Patent Application No. 10-2009-0048565 filed Jun. 2, 2009, the subject matter of which is incorporated herein by reference.

TECHNICAL FIELD

The present disclosure relates to a chimney tray for a reactor, and more particularly, to a high performance chimney tray, wherein a gas reactant and a liquid reactant are mixed well in chimneys so that the liquid reactant is uniformly dispersed on the catalyst bed of a fixed bed reactor to improve dispersion performance of the reactant thereby increasing the contact efficiency between the liquid reactant and the catalyst depending on the uniformity of flow of the liquid reactant, resulting in increased reaction efficiency.

BACKGROUND

Generally, catalyst bed reactors are mainly employed in petrochemical plants. The reaction modes that cause the reaction while liquid and gas reactants simultaneously flow into a catalyst bed include concurrent flow wherein both liquid and gas reactants flow downwards, and countercurrent flow wherein a liquid reactant flows downwards and a gas reactant flows upwards. As such, the reaction efficiency is determined by the contact efficiency of the liquid and gas reactants with the catalyst in the catalyst bed depending on the uniformity of flow of the reactants. Also, in the case where the gas and liquid reactants flow downwards at the same time in the reactor, a chimney tray is used so that the reactants are uniformly dispersed on the catalyst bed, and the number of chimneys is determined depending on the operating conditions of the reactor.

The chimney tray is typically disposed above the catalyst bed, so that a liquid/gas mixture is uniformly dispersed to the catalyst bed to maximize the use of the catalyst. While a predetermined level of the liquid is maintained outside the chimney tray, the liquid is fed into the chimney via holes and comes into contact with the gas being fed at a fast flow rate into the chimney, and is thus dispersed via the lower through-holes of the tray.

FIG. 1 illustrates a typical operation principle of a chimney tray for a catalyst bed reactor. The catalyst bed reactor needs a predetermined space 4 between a tray 1 and a catalyst bed 2. This space 4 enables the gas reactant to flow down at uniform pressure throughout the reactor, and the liquid reactant to be uniformly dispersed from the lower surface of the tray 1. A plurality of chimneys 3 is cylindrical shaped with a predetermined diameter and length and has outlets 3a, 3b having a predetermined diameter at the upper and lower portions thereof and penetrating therethrough. The tray 1 is provided with a plurality of through-holes 1a to edge of which the plurality of chimney 3 are perpendicularly bonded at lower ends thereof.

FIG. 2 shows a chimney tray for a reactor, which is used to more uniformly disperse a liquid reactant on a catalyst bed (Korean Patent No. 0421130), wherein a chimney 3 has a plurality of through-holes having a predetermined diameter, that is, a plurality of outlets which are formed to penetrate therethrough and face each other in a tangential direction with respect to the outer surface of the chimney 3 at the lower end thereof. Also, the outlet has an incline 1b at a predetermined angle along the edge of the lower end thereof. When the angle of the incline 1b increases, the area where the droplets of the liquid reactant spread out on the catalyst bed becomes larger, and the liquid reactant may flow in a radial direction to the axis of the chimney.

The conventional chimneys as shown in FIG. 1 are designed to enable the liquid reactant which flows via the outlets 3a, 3b of the chimneys 3 to collide with the opposite inner walls of the chimneys so that the liquid reactant breaks up into small liquid particles which are then sprayed via the through-holes 1a of the tray and thus uniformly dispersed on the catalyst bed 2. Under typical operating conditions of the catalyst bed reactor, the liquid reactant may flow at a predetermined rate inside the chimney 3, instead of breaking up into the liquid particles, and then may drop toward the lower central portions of the through-holes 1a of the tray 1. However, as the liquid reactant passes through the through-holes of the chimneys, it may intensively flow down to the central portion of the catalyst bed assigned to each chimney thus causing channeling of the liquid reactant and attrition of the catalyst, resulting in increased pressure of the reactor.

In the case of Korean Patent No. 0421130 of FIG. 2, the above problems are alleviated by radially dispersing the liquid reactant with respect to the axis of the chimney via the outlets in the tangential direction at the lower end of the chimney and by changing the angle of the incline 1b. However, the top of the chimney is exposed, and thus the liquid reactant is mixedly fed from the top of the chimney 3 which undesirably deteriorates dispersion performance. Furthermore, depending on the physical properties of the liquid reactant, the droplets may flow down to the lower surface of the tray 1 along the incline 1b, making it difficult to obtain desired dispersion performance.

SUMMARY

Accordingly, the present disclosure provides a chimney tray for a reactor and an appropriate chimney tray array, wherein the chimney tray may be disposed above a catalyst bed of the reactor to improve dispersion performance of a reactant to thus increase the contact efficiency between the reactant and the catalyst bed and also may prevent the liquid reactant from flowing into the chimneys occurring as a result of the liquid reactant being poured onto the chimneys the tops of which are exposed.

In addition, the present disclosure provides a chimney tray having an array of chimneys, which enables a reactant to be uniformly and appropriately distributed to a catalyst bed.

DETAILED DESCRIPTION

An aspect of the present disclosure provides a chimney tray, comprising a tray having a plurality of through-holes, and a plurality of chimneys perpendicularly inserted into the through-holes of the tray and having one or more outlets, wherein each of the plurality of chimneys has a conical lower end which is integrally formed such that it extends from the lower surface of the tray to make an angle of 10~40° with respect to the direction of the normal line of the tray.

Another aspect of the present disclosure provides a chimney tray, further comprising an upper cover provided at the top of the chimney tray to prevent the introduction of a liquid reactant, and outlets penetrating therethrough and facing each other so as to be inclined in a tangential direction of the chimneys.

A further aspect of the present disclosure provides a chimney tray having an array of chimneys designed to accommodate the dispersion form of a liquid reactant, wherein outlets of chimneys, which penetrate therethrough and face each other, are arranged perpendicular to each other, so that the liquid reactant is uniformly and appropriately dispersed on a catalyst bed.

According to the present disclosure, an exemplary chimney tray which is provided to uniformly disperse a liquid reactant on a catalyst bed reactor can remarkably improve dispersion performance of the liquid reactant, thus increasing the contact efficiency between the reactant and the catalyst, resulting in increased reactivity.

Figure 1:
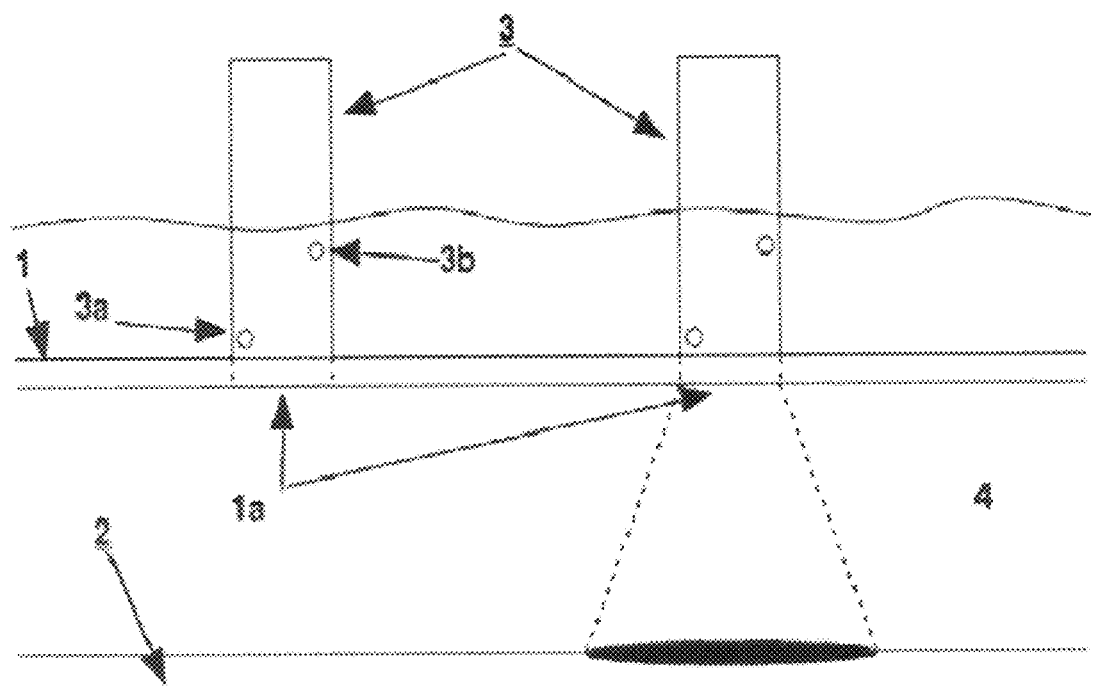
FIG. 1 shows a general operation principle of a chimney tray for a catalyst bed reactor.
Figure 2:
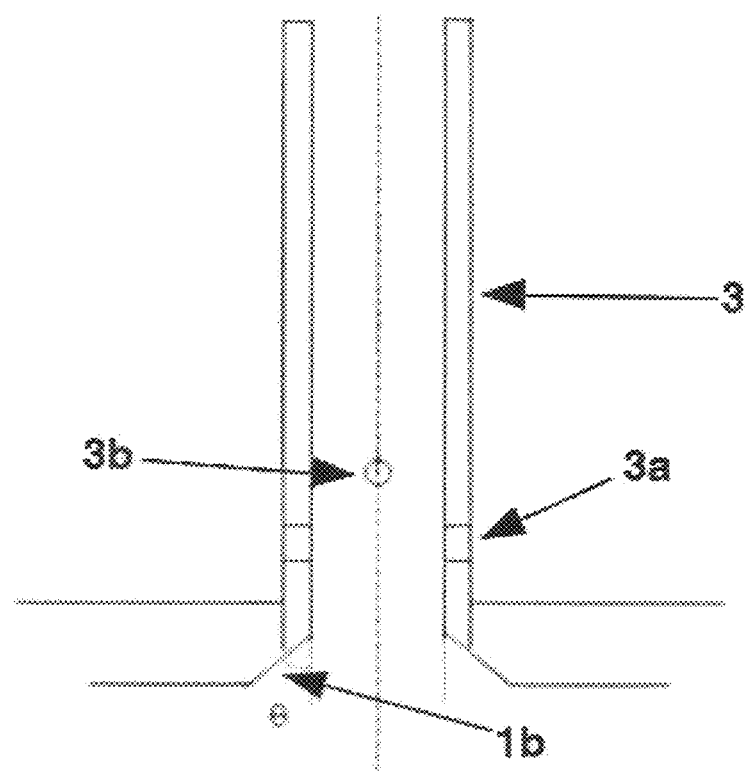
FIG. 2 shows a chimney tray disclosed in Korean Patent No. 0421130.
Figure 3:
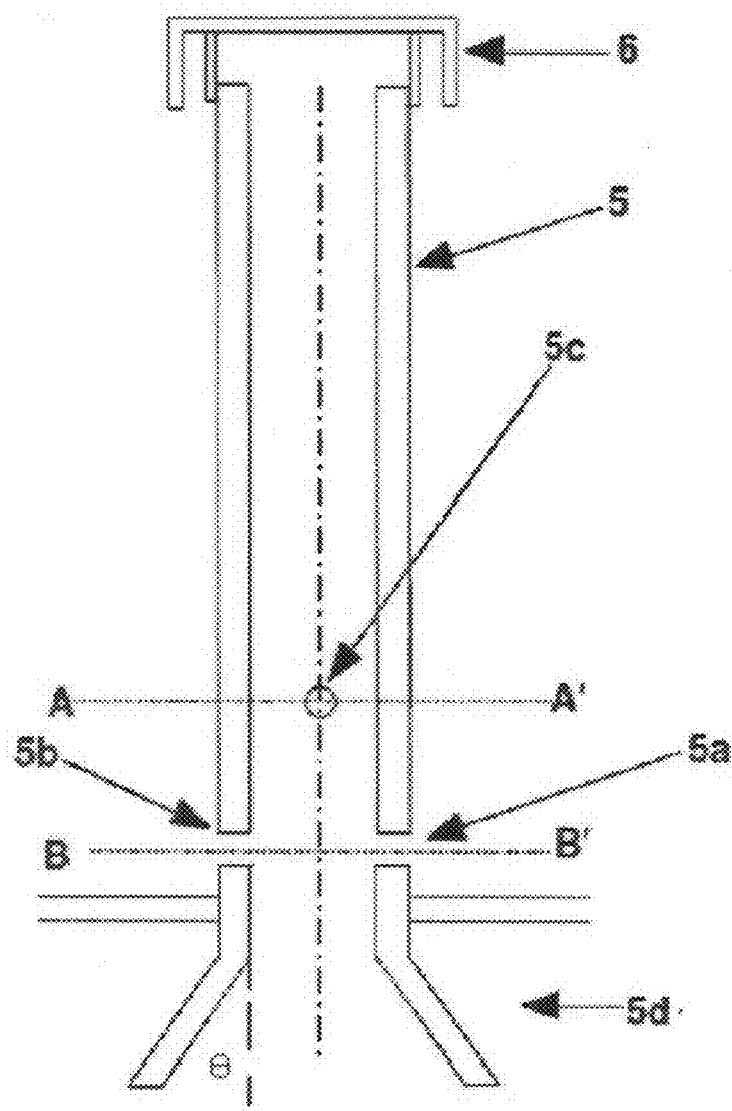
FIG. 3 shows a chimney tray according to an exemplary embodiment of the present disclosure.
Figure 7:
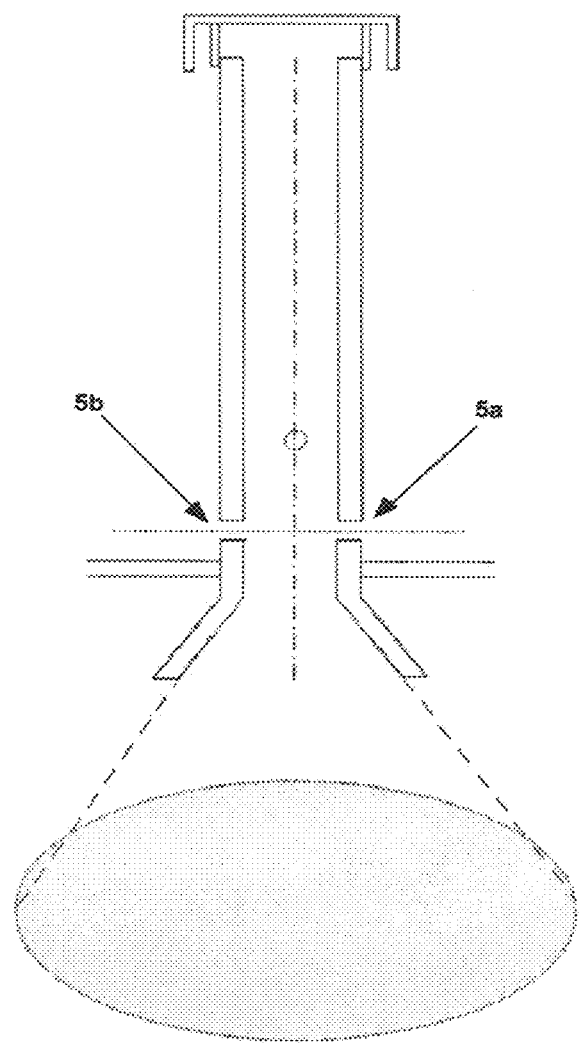
FIG. 7 shows the cross section of the dispersion form in the chimney tray according to the present disclosure.

This disclosure includes a chimney tray for a reactor, comprising a tray having a plurality of through-holes, and cylindrical chimneys inserted into the through-holes, each chimney including an upper cover for preventing the introduction of a liquid reactant into the top of the chimney 5 and controlling the open area depending on the flow rate of a gas reactant so that the flow rate of the gas reactant is increased, a conical lower end which extends from the lower portion of the chimney to make an angle of 10~40° to the direction of the normal line of the tray so that the diameter thereof is increased downwards, and outlets penetrating therethrough and facing each other so as to be inclined in a tangential direction at the lower end thereof. Alternatively, as shown in FIG. 7, a liquid reactant is dispersed and discharged in the form of an oval shape onto the catalyst bed. Taking into consideration the dispersion form of the reactant, the chimneys are arranged such that the outlets of respective chimneys, which penetrate therethrough and face each other, are disposed perpendicular to the outlets of the other chimneys adjacent thereto, which penetrate therethrough and face each other. FIG. 3 shows the construction and coupling structure of the chimney tray for uniformly dispersing the liquid reactant on the catalyst bed according to the present disclosure.

The chimney includes a plurality of first outlets penetrating therethrough and facing each other so that the liquid reactant that is stored above the tray is guided toward the inner wall of the chimney.

Figure 4:
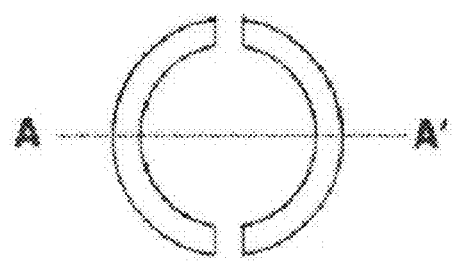
FIG. 4 shows a top plan view taken along the line A-A' of FIG. 3.
Figure 5:
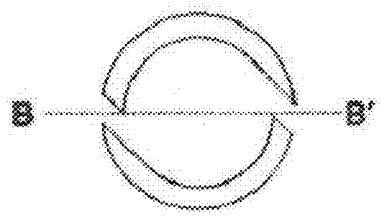
FIG. 5 shows a top plan view taken along the line B-B' of FIG. 3.

As shown in FIG. 5, the outlets are formed to penetrate through the chimney and face each other so as to be inclined in the tangential direction of the transverse cross section of the chimney. The outlets penetrating through the chimney are obliquely formed to make a predetermined angle so that the introduced liquid reactant is subjected to rotary force. The first outlets at one side of the chimneys and the first outlets at the other side thereof, which are formed to face each other, are inclined at the same angle, whereby the liquid reactant is subjected to rotary force in the same direction. Because the liquid reactant which flows down in the chimney via the first outlets is subjected to rotary force by means of the first outlets, the flow rate of the liquid reactant at the longitudinal central portion of the chimney may decrease. To supplement it, a plurality of second outlets is formed to penetrate through the chimney and face each other at positions higher than the first outlets so that the liquid reactant is fed to the longitudinal central portion. Because the second outlets allow the liquid reactant to flow into the longitudinal central portion, as shown in FIG. 4, they are formed perpendicular to the tangential direction of the transverse cross section of the chimney.

The top of the chimney 5 is covered with the upper cover to prevent the introduction of the liquid reactant and to control the open area depending on the flow rate of the gas reactant so that the flow rate of the gas reactant is increased. The upper cover 6 has a diameter larger than that of the chimney, and is provided in the form of a hat in which the end thereof is bent downwards, that is, toward the chimney, whereby the introduction of the liquid reactant, which hinders the dispersion of the liquid reactant and the gas reactant, into the opening of the chimney is blocked and the open area of the top of the chimney is reduced, thus increasing the flow rate of the gas reactant to enlarge the area over which the liquid reactant spreads out under the tray. The tray 1 includes an array of a plurality of through-holes having a predetermined diameter which penetrate through the tray.

The chimney 5 is provided in the form of a cylinder, both ends of which have a predetermined diameter and length and are open, and has the plurality of first outlets 5a, 5b, the plurality of second outlets 5c, and the conical lower end 5d. This lower end is provided in the form of a cone which is integrally formed such that it extends from the lower surface of the tray so as to make a predetermined angle with respect to the direction of the normal line of the tray. Unlike Korean Patent No. 0421130 wherein the dispersion effects are achieved via the lower end of the chimney having a predetermined angle, the lower end of the chimney of the present disclosure is formed such that it extends from the lower surface of the tray, thereby basically preventing the liquid reactant from flowing along the lower wall of the tray.

Figure 6:
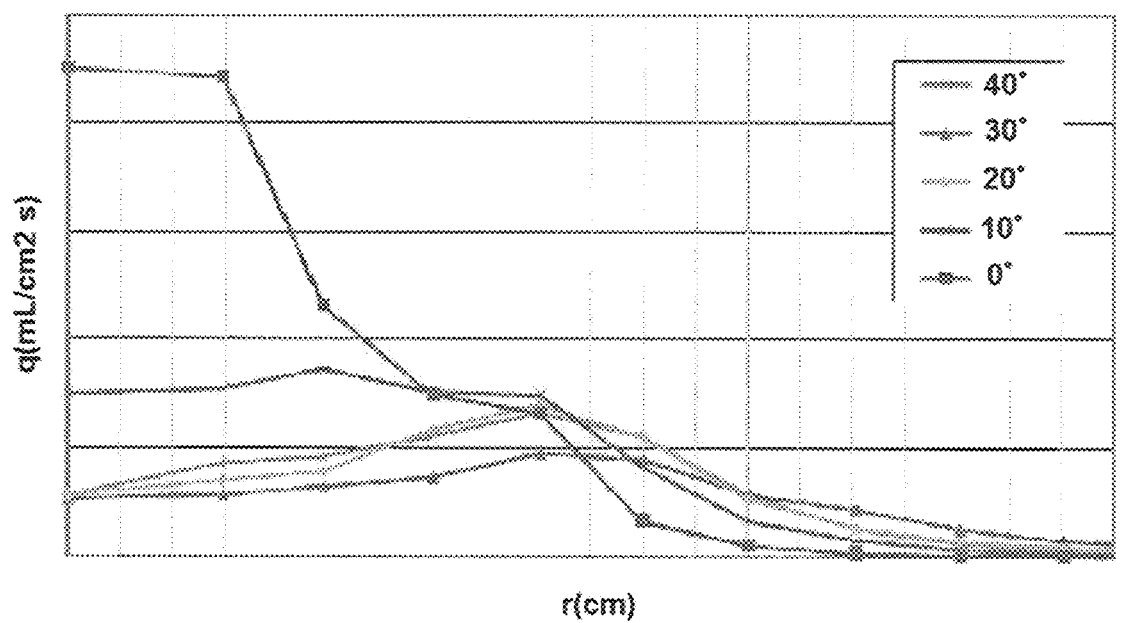
FIG. 6 is a graph showing the dispersion performance at different angles of the conical lower end of the chimney.

The inclination angle ($\theta$) of the lower end of the chimney is selected based on the properties and flow rate of the liquid reactant, and the area where the droplets of the liquid reactant spread out on the catalyst bed 2 may be enlarged depending on the inclination angle. The inclination angle ($\theta$) may be 10~40°, particularly 25~35° to the direction of the normal line of the tray. If the angle is less than 10°, the liquid reactant may be intensively dispersed to the longitudinal central portion. In contrast, if the angle is larger than 40°, the liquid reactant may not be sufficiently dispersed via the plurality of through-holes in the tangential direction at the lower end of the chimney, and thus the droplets thereof may flow along the conical wall, undesirably decreasing the dispersion efficiency. FIG. 6 shows the dispersion performance at different inclination angles. As shown in FIG. 6, when the inclination angle ($\theta$) is 0°, the liquid reactant may be intensively applied to the longitudinal central portion. In contrast, as the inclination angle increases, the liquid reactant may uniformly spread out up to the distance far from the longitudinal central portion.

The lower end of the chimney may be spaced apart from the catalyst bed by a distance of about 180~220 mm. If the lower end of the chimney is spaced apart from the catalyst bed by a distance less than 180 mm, the liquid reactant does not sufficiently spread out making it impossible to obtain desired dispersion performance, and the droplets may be intensively applied, undesirably causing the channeling thereof and the attrition of the catalyst. In contrast, if the lower end of the chimney is spaced apart from the tray by a distance exceeding 220 mm, limitations may be imposed on dispersing the droplets, undesirably obtaining an unsatisfactory amount of dispersion, and also the catalyst filling height may decrease because of the limited height of the reactor.

FIG. 7 shows the cross section of the dispersion form according to the present disclosure. Because the droplets are subjected to rotary force by the plurality of first outlets $5a$, $5b$, the shape of the liquid reactant dropping on the catalyst bed may be not circular but be oval.

Figure 8:
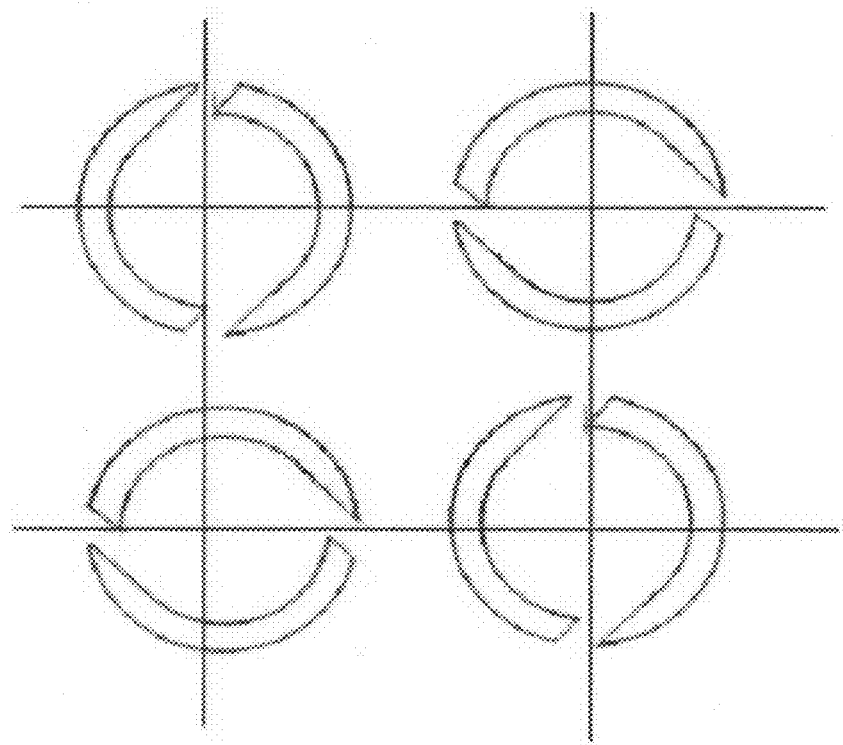
FIG. 8 shows the rectangular array of the chimneys in consideration of the reactant passed through the chimney tray being dispersed in the form of an oval shape.

Considering the dispersion form of the reactant, as shown in FIG. 8, the first outlets of the chimneys, which penetrate therethrough and face each other, are formed such that an imaginary line that connects the first outlets of respective chimneys is orthogonal to an imaginary line connecting the first outlets of the other chimneys adjacent thereto, and thus the plurality of chimneys on the tray is arranged in the form of a rectangular shape. The plurality of chimneys may be arranged in lattice form, and the outlets of respective chimneys are disposed perpendicular to the outlets of the other chimneys adjacent thereto.

This is intended to more uniformly disperse the liquid reactant on the catalyst bed. In the case where the chimneys are arranged so that the outlets thereof face in the same direction, the number of chimneys may excessively increase relative to the same area, making the cost and efficiency unsatisfactory. Also, the dispersion area of the liquid reactant may overlap undesirably lowering the dispersion efficiency. The chimney tray having an array of the chimneys according to the present disclosure may achieve better dispersion performance in consideration of the dispersion form of respective chimneys.

With reference to Korean Patent No. 0421130, the difference between the outer diameter and the inner diameter of the chimney (which is the thickness of the chimney) acts as an important factor for applying rotary force when the liquid reactant passes through the first outlets. As the thickness of the chimney becomes larger, the rotary force may increase but a discharge coefficient (which indicates the obstruction of the flow of a fluid when passing through a small hole) may decrease. For the operation to be optimal, the appropriate rotary force is required. Testing revealed that, in the case of water, the required rotary force may be obtained when the thickness of the chimney is 5 mm or more.

EXAMPLE

The dispersion performance was tested using the chimney tray according to the present disclosure. The angle of the cone with respect to the longitudinal direction of the chimney was 30°. Also, the lower end of each chimney was spaced apart from the catalyst bed by a distance of 200 mm. Also, the flow rate of air per chimney was 50 L/Min, and the flow rate of the liquid reactant per chimney was 9 L/Min.

Comparative Example 1

The dispersion performance was tested at the same flow rates of air and liquid reactant as in the above example, using a conventional chimney tray.

Comparative Example 2

The dispersion performance was tested at the same flow rates of air and liquid reactant as were used above, using the chimney tray disclosed in Korean Patent No. 0421130.

Figure 9:
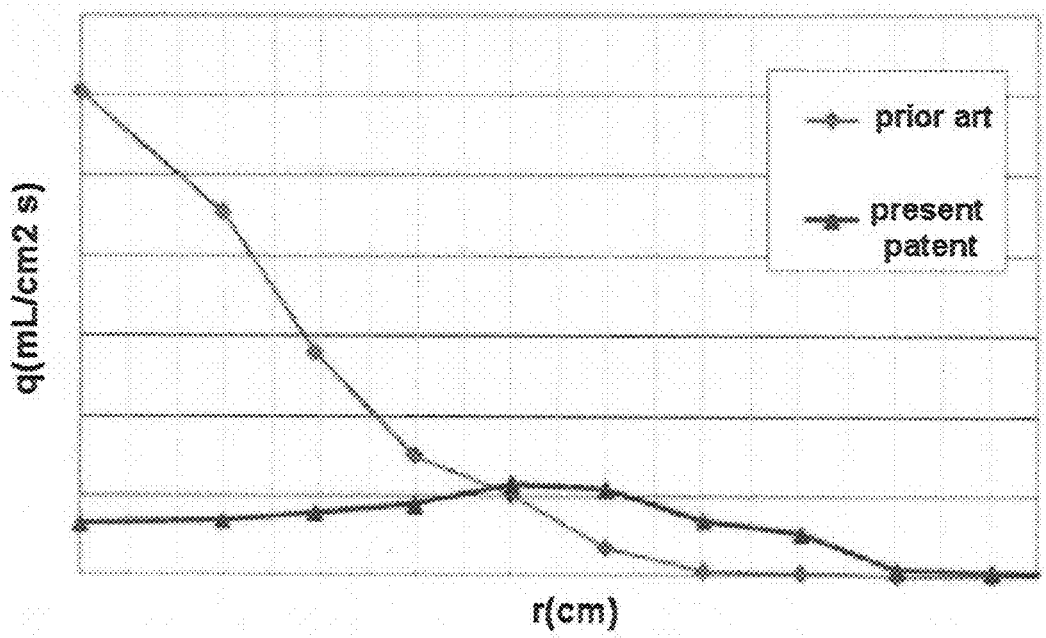
FIG. 9 is a graph showing dispersion performance of Example and Comparative Example 1.

The dispersion performance of Example and Comparative Example 1 is depicted in FIG. 9. As shown in this drawing, the chimney tray of the present disclosure more uniformly dispersed the liquid reactant compared to when the conventional chimney tray was used.

Figure 10:
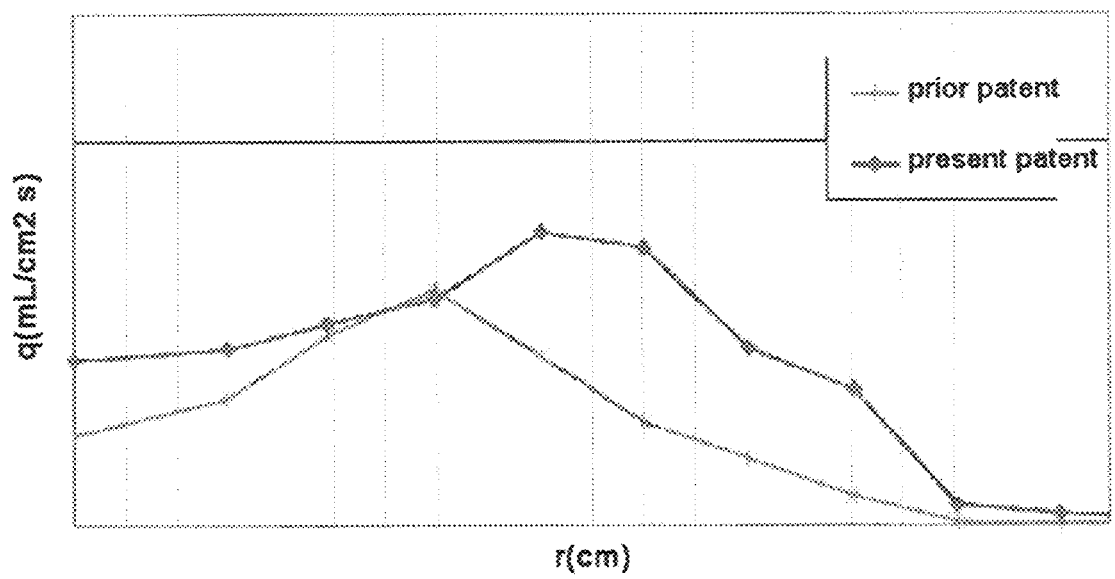
FIG. 10 is a graph showing dispersion performance of the chimney tray disclosed in Korean Patent No. 0421130 and the chimney tray according to the present disclosure.

Also the dispersion performance of Example and Korean Patent No. 0421130 (Comparative Example 2) is depicted in FIG. 10. As shown in this drawing, the liquid reactant was more uniformly distributed compared to Korean Patent No. 0421130. In the case of the chimney tray according to the present disclosure, the lower end of each chimney is formed such that it extends from the lower surface of the tray, unlike Korean Patent No. 0421130, and thereby, the liquid may be prevented from flowing along the lower wall of the tray, thus exhibiting much higher dispersion efficiency, compared to the case of Korean Patent No. 0421130 wherein part of the droplets may flow along the lower wall of the tray by the inclination angle under the tray to thereby negatively affect the dispersion of droplets.

In FIGS. 9 and 10, q indicates the amount of liquid reactant flowing per unit time per unit area at any point on the surface of the catalyst bed assigned per chimney, and r indicates the distance from the center of the area of the assigned catalyst bed.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A chimney tray, comprising a tray having a plurality of through-holes, and a plurality of chimneys perpendicularly inserted into the through-holes of the tray and having one or more outlets, wherein each of the plurality of chimneys includes a conical lower end which is integrally formed such that it extends from a lower surface of the tray to make an angle of 10~40° with respect to a direction of a normal line of the tray, wherein the outlets are formed to penetrate through the chimneys and to face each other so as to be inclined in a tangential direction of a transverse cross section of the chimneys, wherein outlets at one side of the chimneys and outlets at the other side thereof, which are formed to face each other, are inclined at the same angle, wherein the chimneys are arranged such that outlets of respective chimneys, which penetrate therethrough and face each other, are disposed perpendicular to outlets of other chimneys adjacent thereto, which penetrate therethrough and face each other, wherein, in order to more uniformly disperse a liquid reactant on a catalyst bed, the plurality of chimneys is arranged in lattice form, and an imaginary line connecting the outlets of respective chimneys, which penetrate therethrough and face each other, is orthogonal to an imaginary line connecting the outlets of the other chimneys adjacent thereto, which penetrate therethrough.

2. The chimney tray of claim 1, wherein each of the plurality of chimneys further includes an upper cover.

3. The chimney tray of claim 1, wherein the lower end of each of the plurality of chimneys is spaced apart from a catalyst bed by a distance of 180-220 mm.

4. The chimney tray of claim 1, wherein the lower end of each of the plurality of chimneys makes an angle of 25~35° with respect to the direction of the normal line of the tray.

* * * * *